(12) United States Patent
McConnell et al.

(10) Patent No.: US 6,873,986 B2
(45) Date of Patent: Mar. 29, 2005

(54) METHOD AND SYSTEM FOR MAPPING STRINGS FOR COMPARISON

(75) Inventors: John McConnell, Kirkland, WA (US); Julie Bennett, Medina, WA (US); Yung-Shin Lin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 686 days.

(21) Appl. No.: 10/021,546

(22) Filed: Oct. 29, 2001

(65) Prior Publication Data

US 2002/0059224 A1 May 16, 2002

Related U.S. Application Data

(60) Provisional application No. 60/244,288, filed on Oct. 30, 2000.

(51) Int. Cl.[7] ............................................... G06F 17/30
(52) U.S. Cl. .............................. 707/7; 715/536; 704/7; 704/8; 704/10; 382/185; 382/229
(58) Field of Search ..................... 707/7, 5, 6; 715/536; 704/7, 8, 10; 382/185, 229

(56) References Cited

U.S. PATENT DOCUMENTS

| | | | | |
|---|---|---|---|---|
| 5,860,075 A | * | 1/1999 | Hashizume et al. | 715/530 |
| 5,873,111 A | * | 2/1999 | Edberg | 715/536 |
| 6,430,314 B1 | * | 8/2002 | Ko | 382/185 |
| 6,539,118 B1 | * | 3/2003 | Murray et al. | 382/229 |

OTHER PUBLICATIONS

Kim, K, Databases Supporting Hangul (or Korean script), IEEE proceedings on Systems, Man, and Cybernetics, Apr. 11, 1990, pp. 485–490.*
Kwon et al., "Query Expansion Using Domain–Adapted, Weighted Thesaurus in an Extended, Boolean Model"; CIKM 1994, pp. 140–146.*

* cited by examiner

*Primary Examiner*—Luke S. Wassum
*Assistant Examiner*—Khanh Pham
(74) *Attorney, Agent, or Firm*—Christensen O'Connor Johnson Kindness PLLC

(57) ABSTRACT

A method and system for mapping a number of characters in a string, wherein the string comprises a combination of characters representing indexed expressions and a combination of characters representing non-indexed expressions. One embodiment produces a weight array that can be utilized to compare a first and second string having indexed and non-indexed expressions. In one embodiment, a method generates a set of special weights for characters that represent indexed and non-indexed expressions. The method then associates a weight value of an indexed expression with the specific group of characters representing a specific non-indexed expression, and generates a weight array by retrieving a plurality of special weights associated with the specific group of characters representing the specific non-indexed expression and the associated weight value of the indexed expression.

19 Claims, 11 Drawing Sheets

(*Background*)

| Line | Hangul & Jamo Codes | Description of Jamo Order |
|---|---|---|
| 1 | U+AC00 = U+1100, U+1161 | (1st leading consonant, 1st vowel) |
| 2 | U+AC01 = U+1100, U+1161, U+11A8 | (1st consonant, 1st vowel, 1st trailing consonant) |
| 3 | U+AC02 = U+1100, U+1161, U+11A9 | (1st consonant, 1st vowel, 2nd trailing consonant) |
| 4 | U+AC03 = U+1100, U+1161, U+11AA | (1st consonant, 1st vowel, 3rd trailing consonant) |
| 5 | ... | |
| 6 | ... | |
| 7 | U+AC1B = U+1100, U+1161, U+11C3 | (1st consonant, 1st vowel, 27th trailing consonant) |
| 8 | ... | |
| 9 | U+AC1C = U+1100, U+1162 | (1st consonant, 2nd vowel) |
| 10 | U+AC1D = U+1100, U+1162, U+11A8 | (1st consonant, 2nd vowel, 1st trailing consonant) |
| 11 | ... | |
| 12 | ... | |
| 13 | ... | |
| 14 | U+D7A3 = U+1112, U+1175, U+11C2 | (19th consonant, 21st vowel, 27th trailing consonant) |

FIGURE 2

| Line | Unicode | SM | AW | DW | CW |
|---|---|---|---|---|---|
| 1 | 0xac00 | 0x80 | 3 | 2 | 2 |
| 2 | 0xac01 | 0x80 | 4 | 2 | 2 |
| 3 | 0xac02 | 0x80 | 5 | 2 | 2 |
| 4 | 0xac03 | 0x80 | 6 | 2 | 2 |
| 5 | 0xac04 | 0x80 | 7 | 2 | 2 |
| 6 | 0xac05 | 0x80 | 8 | 2 | 2 |
| 7 | 0xac06 | 0x80 | 9 | 2 | 2 |
| 8 | 0xac07 | 0x80 | 0x0A | 2 | 2 |

FIGURE 3

| Line | Leading Jamo composition | SM | Jamo Special Weight |
|---|---|---|---|
| 1 | U+1100 | 0x80 | 0x03 |
| 2 | U+1101 | 0x80 | 0x04 |
| 3 | U+1100,U+1103 | 0x80 | 0x05 |
| 4 | U+1102 | 0x80 | 0x06 |
| 5 | U+1113 | 0x80 | 0x07 |
| 6 | U+1114 | 0x80 | 0x08 |
| 7 | U+1115 | 0x80 | 0x09 |
| 8 | U+1116 | 0x80 | 0x0A |
| 9 | U+1102,U+1109 | 0x80 | 0x0B |
| 10 | U+1102,U+110C | 0x80 | 0x0C |
| 11 | U+1102,U+1112 | 0x80 | 0x0D |
| 12 | U+1103 | 0x80 | 0x0E |
| 13 | U+1117 | 0x80 | 0x0F |
| 14 | U+1104 | 0x80 | 0x10 |

FIGURE 4A

| Line | Vowel Jamo composition | SM | Jamo Special Weight |
|---|---|---|---|
| 1 | U+1161 | 0x80 | 0x03 |
| 2 | U+1176 | 0x80 | 0x04 |
| 3 | U+1177 | 0x80 | 0x05 |
| 4 | U+1161,U+1173 | 0x80 | 0x06 |
| 5 | U+1162 | 0x80 | 0x07 |
| 6 | U+1163 | 0x80 | 0x08 |
| 7 | U+1178 | 0x80 | 0x09 |
| 8 | U+1179 | 0x80 | 0x0A |
| 9 | U+1163,U+116E | 0x80 | 0x0B |

FIGURE 4B

| Line | Trailing Jamo composition | SM | Jamo Special Weight |
|---|---|---|---|
| 1 | U+11A8 | 0x80 | 0x03 |
| 2 | U+11A9 | 0x80 | 0x04 |
| 3 | U+11A8,U+11AB | 0x80 | 0x05 |
| 4 | U+11C3 | 0x80 | 0x06 |
| 5 | U+11A8,U+11B8 | 0x80 | 0x07 |
| 6 | U+11AA | 0x80 | 0x08 |
| 7 | U+11C4 | 0x80 | 0x09 |
| 8 | U+11A8,U+11BE | 0x80 | 0x0A |
| 9 | U+11A8,U+11BF | 0x80 | 0x0B |

FIGURE 4C

| Line | | Sorted Jamo Unicode | Hangul Unicode | Other Unicode Weights: SM, AW |
|---|---|---|---|---|
| 1 | M | L: U+1100, V: U+1161 | = U+AC00 | [0x80], [0x03] |
| 2 | M | L: U+1100, V: U+1161, T: U+11A8 | = U+AC01 | [0x80], [0x04] |
| 3 | M | L: U+1100, V: U+1161, T: U+11A9 | = U+AC02 | [0x80], [0x05] |
| 4 | O | L: U+1100, V: U+1161, T: U+11A8, U+11AB | NA | NA |
| 5 | O | L: U+1100, V: U+1161, T: U+11C3 | NA | NA |
| 6 | O | L: U+1100, V: U+1161, T: U+11A8, U+11B8 | NA | NA |
| 7 | M | L: U+1100, V: U+1161, T: U+11AA | = U+AC03 | [0x80], [0x06] |
| 8 | O | L: U+1100, V: U+1161, T: U+11C4 | NA | NA |

FIGURE 5

| Line | | Modified Code and Weight Values |
|---|---|---|
| 1 | M | U+AC00 [0x80], [0x03], [0x01], [0x01], [0x01], [0x01], [0x00] |
| 2 | M | U+AC01 [0x80], [0x04], [0x01], [0x01], [0x01], [0x01], [0x00] |
| 3 | M | U+AC02 [0x80], [0x05], [0x01], [0x01], [0x01], [0x01], [0x00] |
| 4 | O | L: U+1100, V: U+1161, T: U+11A8, U+11AB [0x80], [0x05], [0xFF], [0x03], [0xFF], [0x03], [0xFF], [0x05], [0x01], [0x01], [0x01], [0x01], [0x00] |
| 5 | O | L: U+1100, V: U+1161, T: U+11C3 [0x80], [0x05], [0xFF], [0x03], [0xFF], [0x03], [0xFF], [0x06], [0x01], [0x01], [0x01], [0x01], [0x00] |
| 6 | O | L: U+1100, V: U+1161, T: U+11A8, 11B8 [0x80], [0x05], [0xFF], [0x03], [0xFF], [0x03], [0xFF], [0x07], [0x01], [0x01], [0x01], [0x01], [0x00] |
| 7 | M | U+AC03 [0x80], [0x06], [0x01], [0x01], [0x01], [0x01], [0x00] |
| 8 | O | L: U+1100, V: U+1161, T: U+11C4 [0x80], [0x06], [0xFF], [0x03], [0xFF], [0x03], [0xFF], [0x09], [0x01], [0x01], [0x01], [0x01], [0x00] |

FIGURE 6

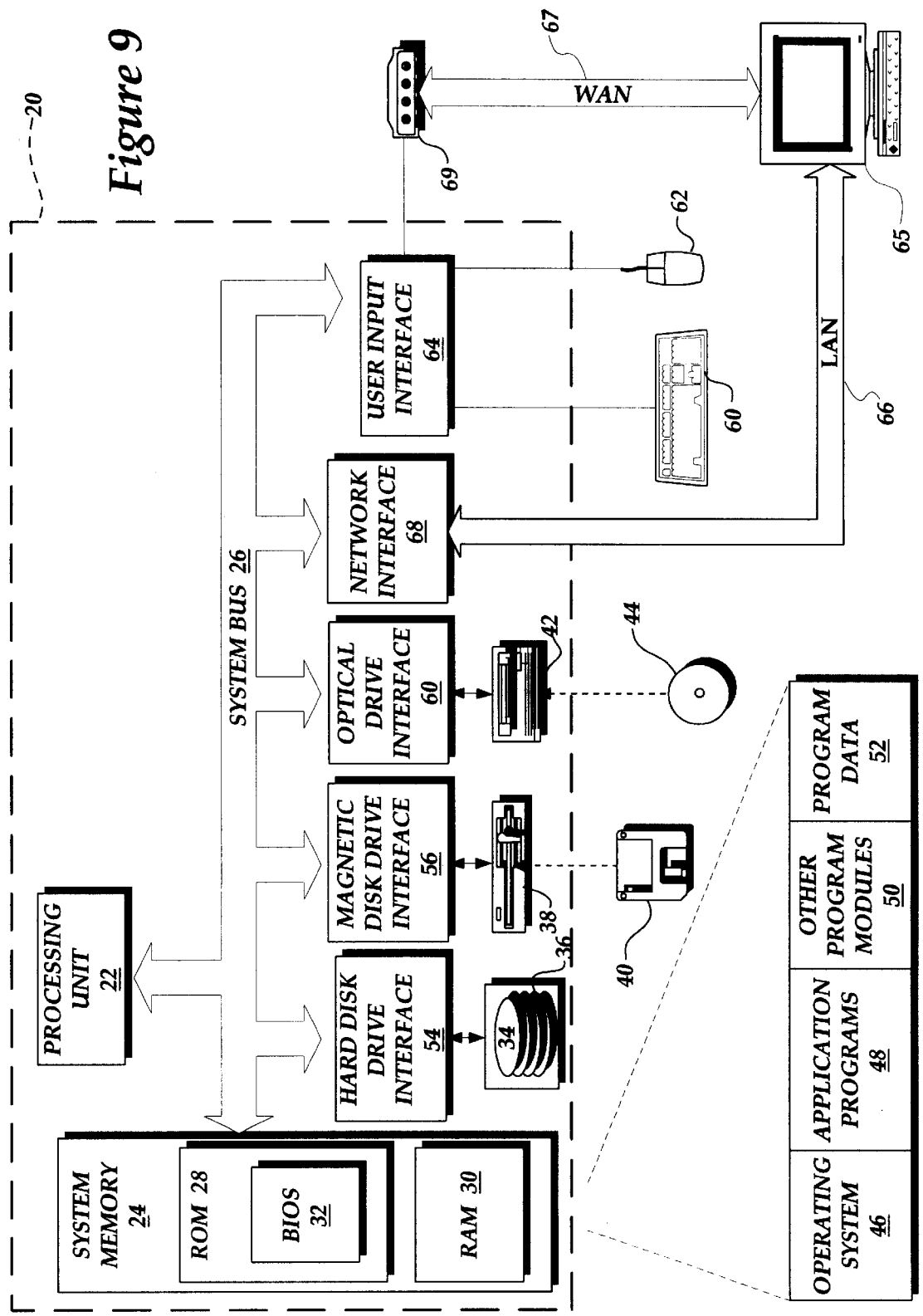

METHOD AND SYSTEM FOR MAPPING STRINGS FOR COMPARISON

CROSS-REFERENCE TO RELATED APPLICATION

This non-provisional patent application claims the benefit under 35 U.S.C. § 119(e) of U.S. Provisional Application No. 60/244,288 filed on Oct. 30, 2000, and entitled "METHOD AND SYSTEM FOR MAPPING STRINGS FOR COMPARISON," the subject matter of which is specifically incorporated herein by reference.

FIELD OF THE INVENTION

The present invention relates to computer software, and in particular, to a method and system for mapping and comparing text strings having different representative weights.

BACKGROUND OF THE INVENTION

Strings are generally considered fundamental data types and many computer applications generally have the ability to compare strings. Although string comparison functionality can be found in a number of software applications, one specific application is the use of strings to compare textual data. For example, comparisons between textual strings are utilized by software applications and operating systems to sort characters and words in various languages.

It is well known to one of ordinary skill in the art that there are many computer-implemented algorithms designed for comparing textual strings. For instance, string comparison algorithms exist in the core of many operating systems and are an integral part of most database programs. These existing systems are sufficient for conducting string comparisons, which is ultimately used for sorting and ordering text that represent various languages. As known to one of ordinary skill in the art, numerical codes are used in string comparison algorithms to represent characters in a string, and each character may represent a letter from an alphabet of any language. More specifically, the numerical codes that represent the characters are utilized by computing devices to order, sort and prioritize the character strings according to a desired format, such as for example a database that orders strings in alphabetical order.

One known universal coding and indexing system, generally referred to as Unicode, is commonly utilized in computing applications for sorting and ordering textual strings. General background information of the Unicode Standard can be found in the published document entitled "Unicode Standard Version 3.0, Addison Wesley, Unicode Consortium, ISBN 0-201-61633-5," the subject matter of which is specifically incorporated herein by reference. The Unicode Standard is generally functional for allowing software applications to sort and order textual strings that represent various letters and words from a common language. More specifically, the Unicode Standard generally groups symbols from a common language as a series of successive 16-bit values. As can be appreciated by one of ordinary skill in the art, most commonly known languages are indexed in the Unicode system. However, there still exists many languages that comprise a plurality of alphabets and/or character sets, where the Unicode Standard does not provide a way to map, sort, and compare every word or character. These alphabets and/or characters that are not part of a standard indexing system are referred to as non-indexed characters.

One illustrative example of a textual string comparison application involves the Korean language, which incorporates Hangul. As will be generally understood by one skilled in the relevant art, modem Hangul has the desirable property that there is exactly one modem Hangul character per syllable. To facilitate comparison between modem Hangul characters, each modem Hangul character/syllable has consequently been assigned a unique numeric weight value. One skilled in the relevant art will appreciate that Unicode is a 16-bit encoding standard in which each character in a variety of languages is given a unique numerical representation. Accordingly, by assigning each modern Hangul character a numeric weight in an ascending manner, a comparison of Hangul characters is accomplished by mathematically comparing the character's numeric weights.

While the above-described system provides a system for comparing the most modern characters, some languages, such as the Korean language, present a unique situation in which certain characters, such as old Hangul characters, are not fully incorporated in existing coding or indexing systems. For instance, old Hangul characters are not entirely incorporated in the Unicode system. Thus, old Hangul characters cannot be readily compared to modern Hangul characters by the use of generally known character comparison and sorting methods.

Accordingly, in view of the above problems, there exists a need for a system and method that allows computing devices to execute string comparison functions that involve complex languages not fully indexed in a coding system. In addition, there exists a need for a system and method for sorting and processing old Hangul characters with modern Hangul characters.

SUMMARY OF THE INVENTION

The present invention provides a method and system for mapping a number of characters in a string, wherein the string comprises a combination of characters representing indexed expressions and a combination of characters representing non-indexed expressions. One embodiment produces a weight array that can be utilized to compare a first and second string having indexed and non-indexed expressions. In one specific embodiment, a method generates a set of special weights for a plurality of characters representing indexed and non-indexed expressions. The method then associates a weight value of an indexed expression with a specific group of characters representing a specific non-indexed expression, and generates a weight array by retrieving a plurality of special weights associated with the specific group of characters representing the specific non-indexed expression and the associated weight value of the indexed expression. A comparison method of the present invention then utilizes the weights in the weight array to compare first and second strings having indexed and non-indexed expressions.

In yet another embodiment, a method produces a weight array that can be utilized to compare a first and second string having old and modern Hangul. In this embodiment, the method generates a set of special weights for a plurality of Jamo combinations that represent old and new Hangul. The method then associates a weight value of a modern Hangul with a specific group of Jamo characters representing a specific old Hangul, and generates a weight array by retrieving a plurality of special weights associated with the specific group of Jamo characters representing the specific old Hangul and the associated weight value of the modern Hangul. In one alternative embodiment, the weight array is constructed by appending the plurality of special weights associated with the specific group of Jamo characters to the associated weight value of the modern Hangul.

In another embodiment of the present invention, a routine for testing the validity of an old Hangul character is combined with a weight mapping process to generate a weight array. The weight arrays produced by the present invention allows for a computer-implemented text comparison of two or more strings having indexed and non-index characters.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a representative section of a Unicode table showing codes that are assigned to Hangul characters utilized in one illustrative example of the present invention;

FIG. 3 is a representative section of a data table comprising weighted values in accordance with the Unicode standard;

FIGS. 4A–4C illustrate representative sections of several data tables showing Jamo special weight values that are utilized in accordance with the present invention;

FIG. 5 is a representative section of a modified Unicode table illustrating a set of sorted codes that represent old and modem Hangul characters in accordance with the present invention;

FIG. 6 is a representative section of a modified Unicode table illustrating weight values for old and modem Hangul characters in accordance with the present invention;

FIG. 9 illustrates an example of one suitable computing system environment in which the invention may be implemented.

DETAILED DESCRIPTION OF THE PREFERRED EMBODIMENT

Figure 1:
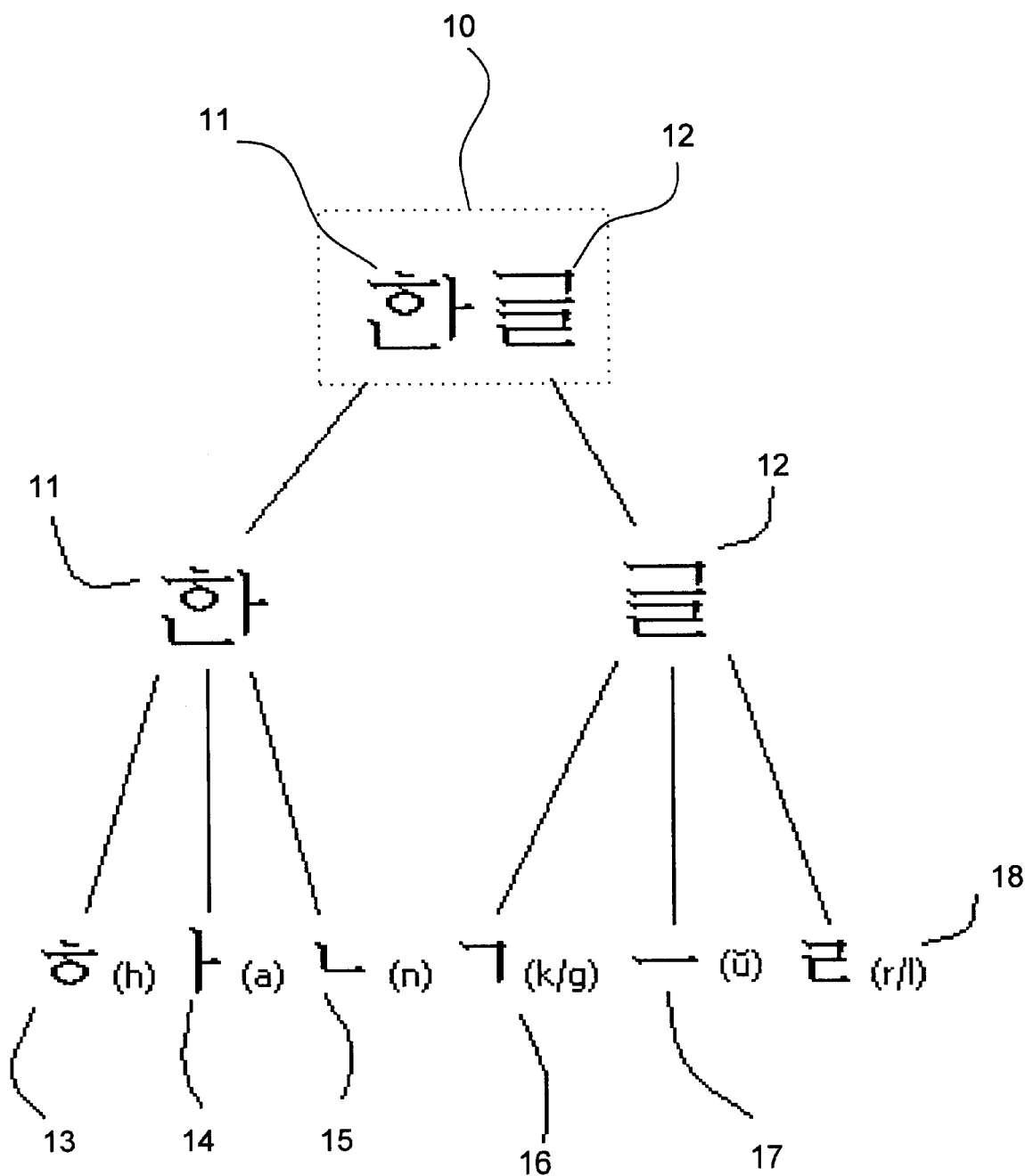
FIG. 1 is a diagram illustrating the structure of a Korean word used to illustrate aspects of the present invention.

The present invention is directed toward a method and system for mapping and comparing textual strings. The present invention will be described in relation to a system and method for mapping a first set of language characters having a first set of numeric weight values to a second set of language characters having a second set of numeric weight values to facilitate a comparison of the first and second set of characters. In one illustrative example, one method of mapping characters involves the sorting of text strings of old Hangul Jamo character numeric weight values with modem Hangul numeric weight values. As will be readily understood by one skilled in the relevant art, the present invention is not limited in its application to mapping old and modem Korean Hangul characters as the system and method of the present invention may be applied to any other language. Thus, it is to be understood that the disclosed embodiment is only by way of example and should not be construed as limiting.

The following summary of the present invention first provides an overview of one suitable computing environment in which the invention may be implemented. The summary then provides a general description of a method for sorting and mapping characters. Lastly, the summary provides an illustrative example of one computer-implemented method for sorting and mapping characters.

FIG. 9 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention is operational in numerous other general purposes such as well known computing systems, environments, and/or configurations. Example of such that may be suitable for implementing the invention include, but are not limited to personal computers, server computers, laptop devices, multiprocessor systems, microprocessor-based systems, network PCs, minicomputers, mainframe computers, distributed computing environments that include any of the above systems or the like.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose-computing device in the form of a computer 20. Components of a computer 20 include, but are not limited to, a processing unit 22, a system memory 24, and a system bus 26 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) normal capitalization bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 20 typically includes a variety of computer-readable media. Computer-readable media can be any available media that can be accessed by the computer 20 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 20.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 24 includes computer storage media in the form of volatile and/or non-volatile memory such as read only memory (ROM) 28 and random access memory (RAM) 30. A basic input/output system 32 (BIOS), containing the basic routines that help to transfer information between elements within the computer 20, such as during start-up, is typically stored in ROM 28. RAM 30 typically contains data and/or program modules that are immediately accessible to and/or presently being operated on by the processing unit 22. By way of example, and not limitation, FIG. 9 illustrates an operating system 47, application programs 48, other program modules 50, and program data 52.

The computer 20 may also include removable/non-removable, volatile/non-volatile computer storage media. By way of example only, FIG. 9 illustrates a hard disk drive 34 that reads from or writes to non-removable, non-volatile magnetic media 36, a magnetic drive 38 that reads from or writes to a removable, nonvolatile magnetic disk 40, and an optical disk drive 42 that reads from or writes to a removable, non-volatile optical disk 44, such as CD-ROM or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 34, magnetic disk drive 38, and optical disk drive 42 may be connected to the system bus 27 by a hard disk drive interface 54, a magnetic disk drive interface 56, and an optical drive interface 60, respectively. Alternatively, the hard disk drive 34, magnetic disk drive 38, and optical disk drive 42 are typically connected to the system bus 27 by a Small Computer System Interface (SCSI).

The drives and their associated computer storage media discussed above and illustrated in FIG. 9, provide storage of computer-readable instructions, data structures, program modules and other data for the computer 20. In FIG. 9, for example, the hard disk drive 34 is illustrated as storing the operating system 46, application programs 48, other programs 50, and program data 52. Note that these components can either be the same as or different from the operating system 46, the other program modules 50, and the program data 52. A user may enter commands and information into the computer 20 through input devices such as a keyboard 60 and a pointing device 62, commonly referred to as a mouse, track ball or touch pad. Other input devices (not shown) may include a microphone, a joystick, a game pad, a satellite dish, a scanner, or the like. These and other input devices are often connected to the processing unit 22 through user input interface 64 and may be connected by other interface and bus structures, such as a parallel port, game port or other universal serial bus (USB).

The computer 20 may operate in a network environment using logical connections to one or more remote computers 65. The remote computer 65 may be a personal computer, a server, a router, a network PC, a peer device or other common network node, and typically includes many or all of the elements described above relative to the computer 20, although only a memory storage device has been illustrated in FIG. 9. The logical connections depicted in FIG. 9 include a local area network (LAN) 66 and a wide area network (WAN) 67, but also include other networks. Such network environments are commonplace in office, enterprise-wide computer networks, Intranets, and the Internet. One skilled in the relevant art will appreciate that the computer 20 may be configured such that at least one network connection is non-continuous. Accordingly, the computer 20 would be unable to communicate with the remote computer 65 throughout a period of time that the network connection is disabled. Such a configuration is described generally as an "off-line" configuration.

When used in a LAN network environment, the computer 20 is connected to the LAN 67 through a network interface adapter 68. When used in a WAN network environment, the computer typically includes a modem or other means for establishing communications over the WAN 68, such as the Internet. The modem, which may be internal or external, may be connected to the system bus 26 via the serial port interface or other appropriate mechanism. In a networked environment, program modules depicted relative to the computer 20, or portions thereof, may be stored in the remote memory storage device. By way of example, and not limitation, FIG. 9 illustrates remote application programs 48 as residing on memory device 24. It will be appreciated that the network connections shown are exemplary and other means of establishing communication between the computers may be used. Although many other internal components of the computer 20 are not shown, those of ordinary skill will appreciate that such components and their interconnection are well known. Accordingly, additional details concerning the internal construction of the computer 20 need not be disclosed in connection with the present invention.

Those skilled in the art will understand that program modules such as the operating system 46, the application programs 48 and data 52 are provided to the computer 20 via one of its memory storage devices, which may include ROM 28, RAM 30, hard disk drive 34, magnetic disk drive 38, or optical disk device 42. The hard disk drive 34 is used to store data 52 and the programs, including the operating system 46 and application programs 48.

When the computer 20 is turned on or reset, the BIOS 32, which is stored in ROM instructs the processing unit 22 to load the operating system from the hard disk drive 34 into the RAM 30. Once the operating system 46 is loaded into RAM 30, the processing unit executes the operating system code and causes the visual elements associated with the user interface of the operating system to be displayed on the monitor. When a user opens an application program 48, the program code and relevant data are read from the hard disk drive and stored in RAM 38.

In accordance with one aspect of the present invention, a method for comparing and mapping strings of characters is provided. As described below, in an example involving the Korean language, one method of the present invention maps old Hangul to modem Hangul by the use of a unique numeric weight schema. The results of the mapping method are then used in a method for comparing text strings of old and modem Hangul characters.

To facilitate the following summary of one illustrative embodiment of the present invention, a general description of the Korean language is provided. Generally described, Korean words are written in Hangul, and Korean Hangul are composed from individual characters, referred to as Jamos.

Referring now to FIG. 1, a diagram illustrating the structure of a Korean word is illustrated. As shown in FIG. 1, two Hangul characters 11 and 12 are combined to form a word 10, which means "Hangul." FIG. 1 also diagrammatically illustrates how individual Jamo characters 13–18 are combined to form each Hangul character 11 and 12. The Korean characters 11 and 12 depicted in FIG. 1 are considered to be modern Hangul characters.

In the Korean language, it is commonly known that each modem Hangul is represented by two or three Jamo characters. It is also known that all of the Jamo characters are classified into three sets: the first set is referred to as "leading consonants," the second set referred to as "vowels," and the third set referred to as "trailing consonants." Accordingly, modern Hangul characters are always written in two forms: (1) one form having one leading consonant and one vowel or (2) another form having one leading consonant, one vowel, and one trailing consonant.

In the entire set of Jamo characters, there are ninety-six leading consonants, sixty-six vowels, and eighty-two trailing consonants. Of all Jamo characters, only a subset of the Jamo characters is used to compose modern Hangul characters. More specifically, modem Hangul characters only use nineteen leading consonants, twenty-one vowels, and twenty-seven trailing consonants. In accordance with the Unicode Standard, this subset of Jamo characters is assigned to a specific range of codes. More specifically, the leading consonants have a Unicode Range of (U+1100) through (U+1112), the vowels have a Unicode Range of (U+1161) through (U+1175), and the trailing consonants have a Unicode Range of (U+11A8) through (U+11C2). Accordingly, this subset of Jamo characters produces ((19×21×27+19×21)=11,172) possible combinations. In other words, the subset of Jamo characters can be assembled to produce 11,172 distinct modem Hangul characters. Since there is a fixed number of modem Hangul characters, the modern Hangul characters are each assigned a specific code in accordance with the Unicode Standard. More specifically, the modem Hangul characters are assigned to a Unicode Range (U+AC00) through (U+D7A3).

Given this relation between the subset of Jamo characters and modem Hangul characters, the codes that represent the modem Hangul characters (U+AC00 through U+D7A3) can be mapped to codes that represent the combination of Jamo characters. Accordingly, a data table may be generated to associate the combinations of the Jamo characters to each modern Hangul. For example, FIG. 2 is a representative section of a data table illustrating one embodiment of a character map that shows the relationship between modern Hangul characters and the related Jamo characters.

As shown in FIG. 2, a first modern Hangul character having a code of (U+AC00) is composed of a first leading consonant having a code of (U+1100) and a first vowel having a code of (U+1161). The second Hangul character of code (U+AC01), is composed of a first leading consonant having a code of (U+1100), a first vowel having a code of (U+1161), and a first trailing consonant having a code of (U+11A8). As shown in FIG. 2, the codes that represent the Hangul characters are ordered in an ascending fashion and each Jamo combination is also systematically ordered in an ascending fashion. Accordingly, the remaining codes for the Jamo combinations can be extrapolated to complete the table, as indicated by the last Hangul character having a code of (U+D7A3) and a combination of Jamo codes of (U+1112), (U+1175) and (U+11C2).

As known to one skilled in the art, the above-described Unicode System utilizes a weighting system for assisting computer programs to sort characters in a text string, such as modem Hangul. Accordingly, Unicode weight values can be associated to the codes that represent each Hangul character. For example, FIG. 3 illustrates a representative section of a data table showing several Unicode weighting values for ten Hangul characters (lines 1–8). Lines 1–3 of the data table of FIG. 3 illustrate the weighting values for the first three Hangul characters (lines 1–3) shown in FIG. 2.

As shown in FIG. 3, the first column lists the Unicode for each Hangul, the second column represents the Script Member, the third column represents the Alphanumeric Weight, the fourth column represents the Diacritic Weight, and the fifth column represents the Case Weight of each Hangul. As known to one of ordinary skill in the art, systems utilizing the Unicode standard order each character by the assigned Script Member, Alphanumeric Weight of (3), and then by the other remaining weights. For example, since the first character (U+AC00) has a Script Member of 0X80 and an Alphanumeric Weight of three, and the second character (U+AC01) has the same Script Member, but a greater Alphanumeric Weight, the second character (U+AC01) will be sorted after the first character (U+AC00).

As described above, the Unicode system provides a weight code map for modem Hangul characters for the ordering and sorting of strings composed of Jamo and modern Hangul characters. However, the above-described Unicode system does not fully accommodate all characters of the Korean language. For instance, the above-described Unicode system does not have assigned codes for the characters that are known as old Hangul. In addition, the existing Jamo Unicodes cannot be used for sorting old Hangul because the composition rules of the old Hangul characters are different than the composition rules of the modern Hangul. More specifically, the old Hangul characters are made up of more than three Jamos. As described above, a modern Hangul character is generally represented by three Jamos: a leading consonant, a vowel, and a trailing consonant. On the other hand, old Hangul is represented by one to three leading consonants, one to three vowels, and can have zero to three trailing consonants. Thus, an old Hangul character can be composed of three to nine Jamos.

As described above, the general Unicode rules for identifying and sorting modern Hangul characters from a combination of Jamo character codes cannot be applied to methods for sorting old Hangul. For example, one old Hangul character may comprise of two leading consonants, a vowel and a trailing consonant. When applying the Unicode standard to this example, an old Hangul character may be represented by the Jamo codes: (U+1100), (U+1103), (U+1161), (U+11A8). With reference to the Unicode table of FIG. 2, this combination of Jamo codes could not be properly sorted because the existing system does not accommodate combinations having two leading consonants. In another example, an old Hangul character may be composed from Jamo characters represented by the codes: (U+1113), (U+1161), and (U+11A8). Since this leading consonant code, (U+1113), is out of the range of assigned leading consonants for modern Hangul, (U+1100) through (U+1112), this combination of Jamo character codes could not be properly sorted in accordance with the Unicode system.

In other situations, computer programs utilizing the Unicode system cannot readily distinguish old Hangul from modem Hangul based on an analysis of the Jamo characters. For example, although the code combination for (U+1100), (U+1103) is a valid Jamo combination for old Hangul; the code combination of (U+1100), (U+1101) is not a valid Jamo combination for old Hangul. Because of these discrepancies in the sequences of Jamo characters, old and modern Hangul characters cannot be readily sorted by a simplified analysis of the corresponding Jamo characters. An example of this discrepancy and an exemplary solution is described in further detail below with reference to the data table of FIG. 6.

To facilitate string comparisons between old and modern Hangul, one aspect of the present invention provides a weighting schema for various Jamo characters and Jamo character combinations. More specifically, it is one aspect of the present invention to assign Jamo special weights to combinations of leading consonants, vowels, and trailing consonants. By assigning Jamo special weights to a set of Jamo characters that compose both modern and old Hangul, a computing device may distinguish and sort old and modern Hangul.

Referring now to FIGS. 4A–4C, one embodiment of a weighting schema is shown. Generally described, the representative sections of each character map shown in FIGS. 4A–4C illustrate one method of assigning specific weights to an ordered set of Jamo characters and combinations of Jamo characters. As shown in FIG. 4A, a representative section of a data table illustrating Jamo special weights for all valid leading consonant Jamo combinations is shown. In the assembly of the weighting schema table of FIG. 4A, each leading consonant, and the combinations of Jamo leading consonants, are sorted in an ascending order in accordance with the grammatical rules of the Korean language. Once each leading consonant has been properly arranged, a unique code may be assigned to each leading consonant. For example, as shown in the first row of the table of FIG. 4A, the Jamo character represented by (U+1100) is assigned a Jamo special weight value of (0X03). The remaining Jamo compositions are then assigned with special weight values in an ascending order. Also shown in FIG. 4A, the construction of the weighting schema table may also include the integration of other standard Unicode weighting values, such as a Script Member.

FIGS. 4B and 4C respectively illustrate one embodiment of two weighting schema tables for valid combinations of Jamo vowels and trailing consonants. Each data table illustrating Jamo special weights for the Jamo vowels and trailing consonants are constructed in a manner similar to the construction of the weighting table shown in FIG. 4A. More specifically, in the representative section of the weighting table of FIG. 4B, the Jamo vowels, and combination of Jamo vowels, are sorted in accordance with the grammatical rules of the Korean language. In the ordering of each table, the order of the Jamo special weight values should be organized in an ascending manner where each Jamo special weight value corresponds to a valid Jamo. As shown in FIG. 4B, each Jamo vowel is assigned a unique Jamo special weight. The first Jamo vowel is assigned with a Jamo special weight of (0x03), the second Jamo vowel is assigned with a weight of (0x04), etc. Similarly, the first trailing consonant is assigned with a Jamo special weight of (0x03), the second trailing consonant is assigned with a weight of (0x04), etc. Also shown in FIGS. 4B and 4C, the construction of these weighting schema tables may also include the integration of other standard Unicode weighting values, such as the Script Member.

From the above-described embodiments of the Jamo special weight tables, a data table having a combination of sorted old and modern Hangul characters can be properly generated. Referring now to FIG. 5, an illustrative example of one section of a data table having old and modern Hangul characters is shown. In one embodiment, the table of FIG. 5 is generated by sorting all of the possible combinations of Jamo characters arranged in accordance to the leading consonant, vowel, and trailing consonant tables of FIGS. 4A–4C. For instance, the hierarchy of the old and modern Hangul table is ordered by first sorting each group of Jamo characters by the leading consonant in accordance with the leading consonant special weight table as shown in FIG. 4A. Each group of characters having the same leading consonant are then sorted by the order of the vowels in accordance with the vowel special weight table as shown in FIG. 4B. Accordingly, each group of characters having the same vowel are then sorted by the order of the trailing consonants in accordance with the trailing consonant special weight table as shown in FIG. 4C.

By sorting each Jamo combination in accordance with the special weight table, the Jamo code combinations that represent modem and old Hangul can be properly sorted. With reference to line 4 of FIG. 5, the first old Hangul character, represented by the Jamo characters having the codes (U+1100), (U+1161), (U+11A8) and (U+11AB), is properly ordered after the modern Hangul character represented by the Hangul code (U+AC02) but before the modern Hangul character represented by the Hangul code (U+AC03). This first old Hangul character is placed after the Hangul code (U+AC02) because the corresponding trailing consonants for the old Hangul character, (U+11A8) and (U+11AB), are ordered after the trailing consonant, (U+11A9), for the modern Hangul character represented by the Hangul code (U+AC02).

Each of the remaining old Hangul characters are sorted and mapped in the table of FIG. 5 in accordance with the weighting tables of FIGS. 4A–4C. For instance, as shown in line 5 of the table of FIG. 5, the second old Hangul character, represented by the Jamo characters having the codes (U+1100), (U+1161), (U+11C3), is properly ordered after the first old Hangul character. The second old Hangul character is placed after the first old Hangul character because of the ordering of the special weight table of the trailing consonants shown in FIG. 4C. The remaining old and modem Hangul characters represented by all valid Jamo combinations are sorted in a similar manner by the use of the above-described ordering method. Also shown in FIG. 5, other Unicode standard codes may be integrated into the sorted character table. For instance, the illustrative example of a sorted character of FIG. 5 also includes: the Hangul Unicode for each modern Hangul character, a corresponding Script Member (SM) and a corresponding Alphanumeric Weight (AW) for each combination incorporated in the Unicode standard. Although these specific weights are illustrated in this example, it can be appreciated to one of ordinary skill in the art that any other code or weight value can be added to such a table without falling outside the scope of the present invention. For instance, for illustrative purposes the "O's" are listed in the table rows having code that represent an old Hangul character. Accordingly, the "M's" are listed in the table rows having code that represent a modem Hangul character.

After the character table of the sorted old and modem Hangul characters is constructed, special codes are associated with the Hangul characters that do not have an assigned Unicode value. More specifically, in this illustrative example involving the Korean language, weighting values are associated with each Jamo combination that represents an old Hangul character. In one embodiment of the present invention, Script Member (SM) and Alphanumeric Weight (AW) values associated with each old Hangul character are equal to the (SM) and (AW) values of the preceding modem Hangul character. For example, with reference to the modified Unicode table of FIG. 6, the (SM=0x80) and (AW=0x05) of the second modern Hangul character (line 3) are associated with the first old Hangul character (line 4). As can be appreciated by one of ordinary skill in the art, the association of the (SM) and (AW) values to the old Hangul characters creates a code map that allows generally known sorting algorithms to properly sort old and modern Hangul characters. For instance, by an analysis of the (SM) and (AW) values, the first old Hangul character (line 4) will be properly sorted after the third modem Hangul (line 3) but before the fourth modern Hangul (line 7).

Also shown in the example of FIG. 6, the (SM) and (AW) values of the second modern Hangul character (line 3) are also associated with the second and third old Hangul characters (lines 5 and 6). Hence, the second and third old Hangul characters (lines 5 and 6) are associated with the weighting values of (SM=0x80) and (AW=0x05). The (SM) and (AW) weight values of the remaining old Hangul characters are associated with other weighting values in a similar manner. For instance, the (SM) and (AW) weight values of the fourth old Hangul character (line 8) are associated with the same (SM) and (AW) weight values as the fourth modern Hangul character (line 7). Hence, the fourth old Hangul character (line 8) is associated with the weighting values of (SM=0x80) and (AW=0x06).

Once each old Hangul character is associated to a specific Script Member (SM) and Alphanumeric Weight (AW), other weight values are added to the (SM) and (AW) assigned to the old Hangul characters. More specifically, in one embodiment of a mapping method of the present invention, Jamo special weights are associated with each old Hangul character. Generally described, this association of the Jamo special weights to each old Hangul character provides a code hierarchy that allows computer-implemented algorithms to readily distinguish and sort old Hangul characters.

In one embodiment, the Jamo special weights (of FIGS. 4A–4C) are appended to the (SM) and (AW) of each old Hangul. More specifically, the Jamo special weights of the corresponding leading consonant(s), vowel(s), and trailing consonant(s) are associated to the (SM) and (AW) weighting values of each old Hangul character. For example, the first old Hangul character (line 4 of FIG. 6) is assigned to the Jamo special weights of: [0x03], [0x03], and [0x05]. With reference to the Jamo Special weights of FIGS. 4A–4C, these special weights are from the Jamo special weights for the corresponding leading consonant (U+1100), [0x03]; vowel (U+1161), [0x03]; and corresponding trailing consonants (U+11A8, U+11AB), [0x05]. Also shown in the modified Unicode table of FIG. 6, other arbitrary codes can be assigned to the other fields as fillers, such as the value [0xFF], which functions as a filler value from the Script Member of each old Hangul character. The other [0x01] codes are provided for illustrative purposes to show how other Unicode values can be appended to the Jamo special weights.

By the use of the above-described mapping method, computer-implemented algorithms can readily distinguish and sort old and modern Hangul characters. In addition, the above-described mapping method provides a modified code structure that is compatible with existing Unicode systems.

Now that a summary of a method for sorting and mapping characters has been described, a description of a computer-implemented method for mapping and sorting characters is provided. As described below, in an example involving the Korean language, one method of the present invention maps the old Hangul to modem Hangul by the use of a unique numeric weighting schema. The results of the mapping method are then applied to a method for comparing strings of old and modern Hangul characters.

Figure 7:
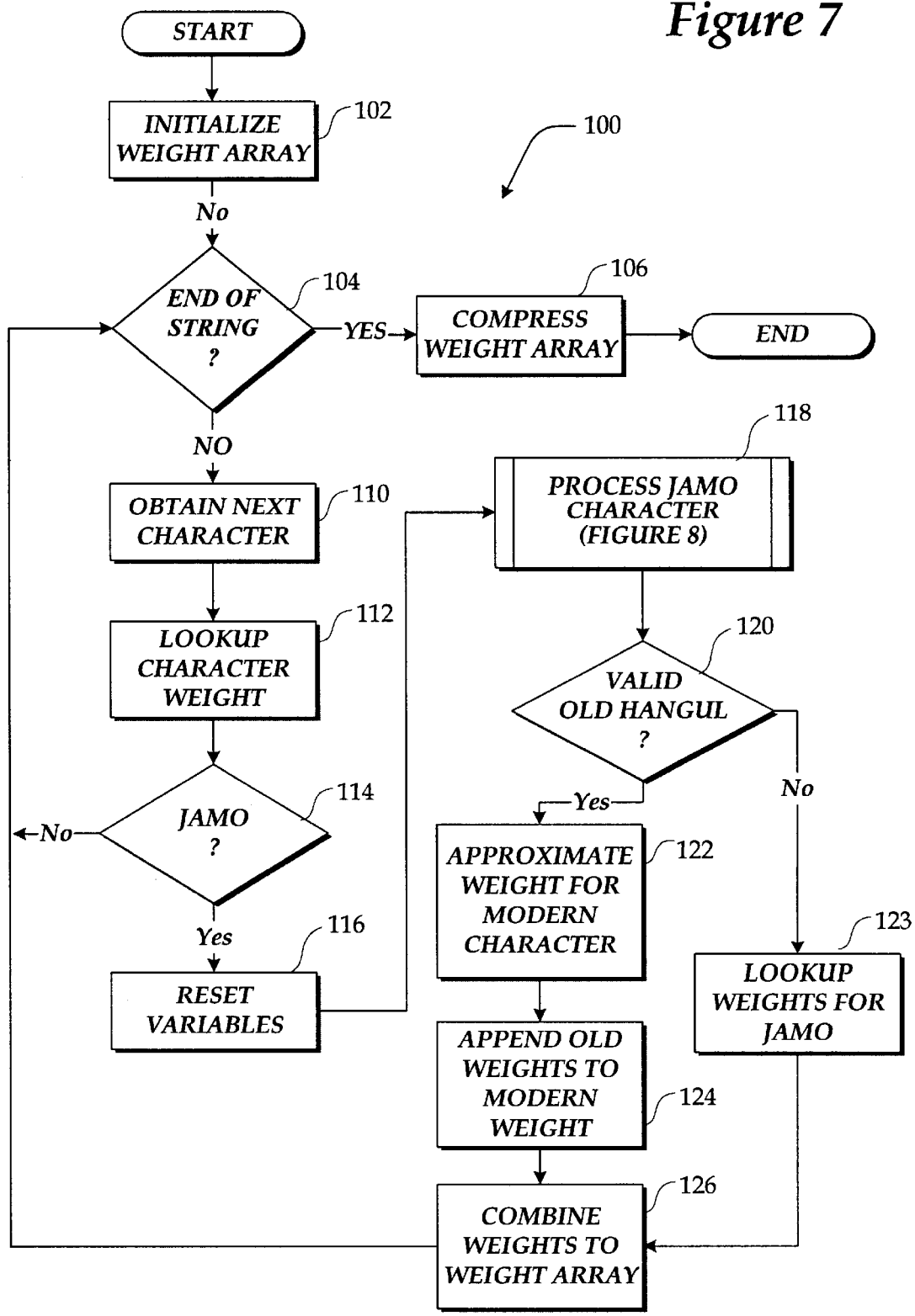
FIG. 7 illustrates a flow diagram illustrative of a numeric weight mapping process in accordance with the present invention.
Figure 8:
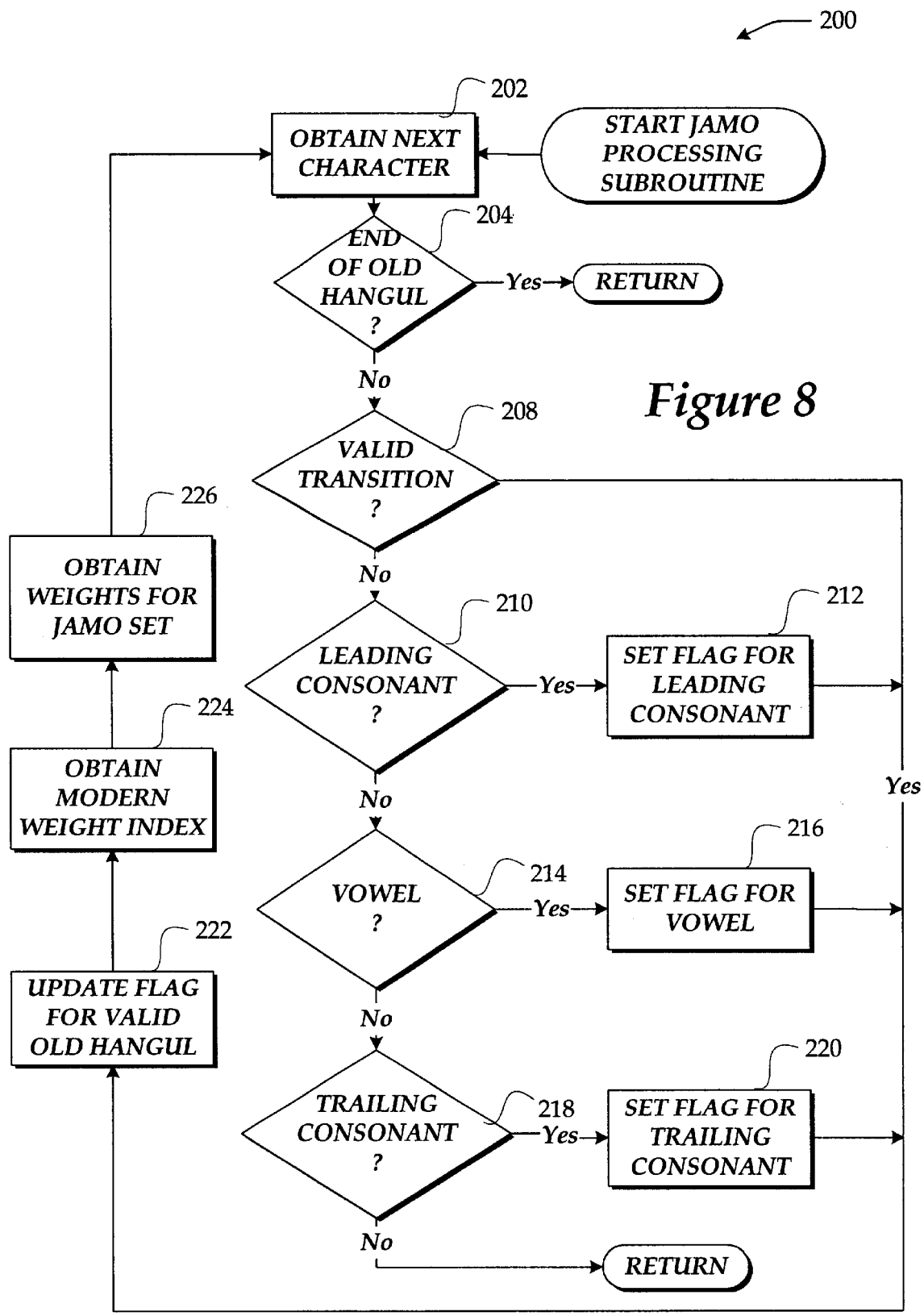
FIG. 8 illustrates a flow diagram of a Jamo validation subroutine in accordance with the present invention.

Referring now to FIGS. 7 and 8 in conjunction with the data tables of FIGS. 2–6, one example of a computer-implemented routine of sorting old Hangul characters with modern Hangul characters is shown and described below. More specifically, FIG. 7 depicts a flow diagram of a numeric weight mapping process 100 in accordance with the present invention. As a subroutine of the numeric weight mapping process 100, FIG. 8 depicts a flow diagram of a Jamo validation subroutine 200 in accordance with the present invention.

In this illustrative example of a numeric weight mapping process, a string of Korean Jamo and Hangul characters is analyzed and a weight array is produced. In this embodiment, a weight array may be similar to the weight arrays having Jamo special codes shown in lines 4–6 of the table of FIG. 6. Once generated, the weight array can be utilized by another sorting process for comparing strings of characters.

As shown in FIG. 7, the numeric weight mapping process 100 begins at block 102, where a weight array is initialized and a pointer is set to the first character in the string that is to be analyzed. In one embodiment, the weight array may be a number of data fields in a computer memory device capable of storing a number of hexadecimal codes, such as those data fields shown in line 4 of the table shown in FIG. 6.

Next, at decision block 104, a test is conducted to determine whether the end of the string has been reached. As can be appreciated to one of ordinary skill in the art, there are many generally known methods for determining the end of a string, thus, this part of the process will not be discussed further. At decision block 106, if the end of the string is reached, the process 100 continues to block 106 where the weight array is compressed. In this part of the process, the weight array can be compressed by any known compression technique. Once the weight array is compressed, the process 100 terminates. As described in more detail below, after the termination of the process 100, the weight array may be then utilized by a sorting routine.

However, at decision block 110, if the end of the string has not been reached, the next character in the string is obtained. This part of the process can be achieved by reading the character value, such as an ASCII or Unicode character value, at the memory location of the pointer. Once the character value is read, the pointer may advance to the next character in the string and the mapping process 100 proceeds to block 112.

At block 112, the numeric weight for the character is obtained. In an actual embodiment of the present invention, the operating system utilizes a Unicode character lookup table to return a Unicode 16-bit numerical code for the character. As can be appreciated by one of ordinary skill in the art, a numeric weight or code can be obtained by a number of generally known code retrieval methods. Once the numeric weight for the character is obtained, the mapping process 100 proceeds to decision block 114.

At decision block 114, a test is executed to determine whether the character is an Hangul Jamo. In an actual embodiment of the present invention, an analysis may be conducted to determine if the numeric weight for the character is within a range of codes for a Jamo character. In one example of the process of block 114, a computing device can determine if the code for the character falls within the range for all leading consonants (U+1100) through (U+1159); vowels (U+1161) through (U+11A2); or all trailing consonants (U+11A8) through (U+11F9).

If the character is not a Hangul Jamo, the process 100 proceeds back to block 104, where a test is again conducted to determine if the end string has been reached. However, at decision block 114, if the character is an Hangul Jamo character, the process continues to block 116 where a set of variables for modern and old Hangul weight values are reset. In addition, the process of block 116 includes a step where a valid old Jamo string flag is reset. As described above, not all Jamo character strings may be valid. Accordingly, one embodiment of the present invention proceeds to block 118 where the process 100 determines if the Jamo characters represent a valid old Hangul character.

At block 118, the process 100 initiates a Jamo validation subroutine to verify if the processed Jamo characters are valid. Referring now to FIG. 8, a flow diagram of a Jamo validation subroutine 118 is shown. The validation subroutine 118 starts at block 202 where a character is obtained from the string. As stated above with reference to block 102, a pointer may be used to mark the character that is to be obtained from the string.

Once the character is obtained in the process of block 202, at decision block 204, a test is conducted to determine if the pointer is at the end of the old Hangul. In one embodiment, the subroutine 118 may determine that the pointer is at the end of the old Hangul if the character is a leading consonant and the previously obtained character is a trailing consonant. Although this example is utilized to illustrate one embodiment of the process of block 204, any test in accordance with the relevant grammatical rules may be used in this process. Thus, if the pointer is at the end of the old Hangul, the subroutine 118 terminates and returns back to the numeric weight mapping process 100. At the same time, if a complete Old Hangul Jamo sequence is found, a validation flag is set to true, and the modern weight index and weights for the Jamo set will be returned to process 100. Otherwise, the validation flag will be set to false, and is returned to process 100 to indicate a complete Old Hangul Jamo sequence is not found.

However, at decision block 204, if the pointer is not at the end of the old Hangul, the subroutine 118 continues to decision block 208 where a test is done to determine whether the character is a valid transition character within the leading consonant, vowel or trailing consonant group. As mentioned above, Jamo characters can be characterized as leading consonants, vowels or trailing consonants. Thus, in one embodiment, the process of decision block 208 may utilize the above-described Unicode ranges of Jamo characters and tables like FIG. 4A, FIG. 4B and FIG. 4C to determine if the character is a valid transition character. In accordance with an actual embodiment of the present invention, a Jamo character is a valid transition character if it is following the first character for each of parts of the old Hangul string. For example, in old Hangul, up to three leading consonants may be utilized to represent an old Hangul syllable. For example, from FIG. 4A, if the previous character is U+1100, and the current character is U+1105, it is not a valid transition character. However, if the previous character is U+1100, and the current character is U+1103 (from FIG. 4A line 3), then it is a valid transition character. In addition, the character is a valid transition if the series of Jamo characters conforms to the grammatical rules. For instance, if the character is the fourth leading consonant, it is not a valid transition character because the old Hangul grammatical rules only allow for a maximum of three leading consonant characters.

At decision block 208, if the character is a valid transition character, the subroutine 118 continues to block 222, where validation flag for the old Hangul is updated. As will be described in more detail below, the old Hangul validation flag updated in block 222 is utilized by the mapping process 100.

At decision block 208, if the character is not a valid transition character, the subroutine 118 proceeds to block 210 where the subroutine 118 determines if the character is a leading consonant. As described above, the process of determining the presence of a leading consonant can be carried out by analyzing the Unicode to determine if the Unicode is in the range of codes for all leading consonants. In addition to determining if the character is a leading consonant, the process of block 210 determines if the subroutine 118 has previously analyzed a leading consonant. In this part of the process, the subroutine 118 analyzes the flag that is updated in block 212. Generally described, the process of block 212 sets a flag after a first leading consonant is processed in the subroutine. Therefore, in the process of decision block 210, the subroutine 118 proceeds to block 212 if the character is a leading consonant and if the subroutine 118 has not processed a leading consonant yet. However, at decision block 210, if the subroutine 118 determines that the character is not a leading consonant, and that the leading consonant flag has been set in block 212, the subroutine 118 continues to decision block 214.

At decision block 214, the subroutine 118 determines if the character is a vowel. As described above, the process of determining the presence of a vowel can be carried out by analyzing the Unicode of the character and to determine if the Unicode is in the range of the vowels. In addition to determining if the character is a vowel, the process of block 214 determines if the subroutine 118 has previously analyzed a vowel. In this part of the process, the subroutine 118 analyzes the flag that is updated in block 216. Generally described, the process of block 216 sets a flag after a first vowel is processed in the subroutine 118. Therefore, in the process of decision block 214, the subroutine 118 proceeds to block 216 if the character is a vowel and if the subroutine 118 has not processed a vowel yet. However, at decision block 214, if the subroutine 118 determines that the character is not a vowel and that the flag has been set in block 216, the subroutine 118 continues to decision block 218.

At decision block 218, the subroutine 118 determines if the character is a trailing consonant. As described above, the process of determining the presence of a trailing consonant can be carried out by analyzing the Unicode to determine if the Unicode is in the range of codes for trailing consonants. In addition to determining if the character is a trailing consonant, the process of block 218 determines if the subroutine 118 has previously analyzed a trailing consonant. In this part of the process, the subroutine 118 analyzes the flag that is updated in block 220. Generally described, the process of block 220 sets a flag after a first trailing consonant is processed in the subroutine. Therefore, in the process of decision block 218, the subroutine 118 proceeds to block 220 if the character is a trailing consonant and if the subroutine 118 has not processed a trailing consonant yet. However, at decision block 218, if the subroutine 118 determines that the character is not a trailing consonant, and that the trailing consonant flag has been set in block 212, the subroutine 118 terminates and continues back to the mapping process 100.

After process of blocks 212, 216 or 220, the subroutine 118 progresses to block 222 where a flag is set to indicate that a valid old Hangul is being processed. In one embodiment of the present invention, the default state of the flag indicates that the old Hangul is valid. However, the flag updated in block 222 is changed to a state that indicates that the old Hangul character is invalid when the ordering of the characters do not follow the relevant grammatical rules. For example, the process of block 222 indicates that an old Hangul is invalid when there are four or more consecutive leading consonants in the string.

After the old Hangul validation flag is set in block 222, the subroutine 118 continues at block 224, where a modern weight is obtained. Generally described, this part of the subroutine 118 analyzes the processed Jamo characters and generates one or more weight values that properly identify the old Hangul character that is represented by the processed Jamo characters. In one embodiment, the process of block 224 obtains one or more weight values of a modern Hangul that is most closely related to the processed Jamo characters. More specifically, the weight values of a modern Hangul that precedes the old Hangul character are obtained. This can be carried out by the use of a database similar to the example data table of FIG. 5.

One example of the process of block 224 is shown in the data table of FIG. 5. If the subroutine 118 processes a set of Jamo characters represented by Jamo codes of (U+1100), (U+1161), and (U+11A8, U+11AB); the process of block 224 would the obtain the weight value of the preceding modern Hangul character, which is [0x80] and [0x05]. As described above, the preceding modern Hangul character is determined by one or more sorted lists of the Jamo characters that represent both old and modern Hangul characters, such as those shown in FIGS. 4A–4C.

Next, at block 226, the weight values for the processed Jamos are obtained. In an actual embodiment of the present invention, the process of block 226 returns a number Jamo special weights. One example of a set of Jamo special weights is shown in the data tables of FIGS. 4A–4C. In an application of the above-described example, if the subroutine 118 processes a set of Jamo characters represented by Jamo codes of (U+1100), (U+1161), and (U+11A8, U+11AB); the process of block 226 would obtain the Jamo special weights of [0x03], [0x03], and [0x05]. In the implementation of this step, an operating system or program may utilize any one of a variety of functions for returning a weighting value for a character. For instance, the process of block 226 may retrieve the weight values from a data table, such as those shown in FIGS. 4A–4C, or by any other like method. Once the special weight values for the old Hangul Jamos are obtained, the subroutine 118 then returns to block 202 where the next character in the string is obtained. Accordingly, the subroutine 118 performs a repetitive process until the a complete series of old Hangul Jamo characters (up to 9 Jamo characters) have been processed.

Returning to FIG. 7, after the subroutine 118 has processed the Jamo characters, at decision block 120, a test is conducted to determine whether the series of Jamo characters in the string are valid. In an actual embodiment of the present invention, this step is carried out by an analysis of the validation flag that is assigned in the process block 222 (FIG. 8). At decision block 120, if the validation flag indicates that the old Hangul is not valid, the process 100 continues to block 123 where the weighting values for the Jamo combination is obtained. In one embodiment, the process of block 123 returns the Jamo special weighting values of each Jamo character, such as those weight values obtained in block 226.

However, at decision block 120, if the valid old Hangul flag is set, the process 100 proceeds to block 122 where one or more weight values are obtained. In this part of the process, the weight values generated in process blocks 224 and 226 are obtained. As applied to the example above, the process of block 122 would obtain the weight values of [0x80] and [0x05]. In addition, the process of block 122 would obtain the Jamo special weights of [0x03], [0x03], and [0x05].

After the weight values are obtained, the process 100 proceeds to block 124 where the weight values are associated with the special weights. In one embodiment, the Jamo special weights are appended to the weight values to operate a weight array. As applied to the example above, the process of block 124 would produce the weight array of [0x80], [0x05], [0x03], [0x03], and [0x05].

After the process of blocks 123 or 124, the mapping process 100 combines the generated weights with other weight values in accordance with a standardized indexing system, such as the Unicode system. For instance, in the example of the first old Hangul character in line 4 of FIG. 6, the weight array of [0x80], [0x05], [0x03], [0x03], and [0x05]; is combined with other codes such as a set of filler codes, [0xFF], that properly format the weight array in accordance to a standard indexing system. Although this example illustrates a weight array only having Jamo special weights and weight values of modern Hangul, any other code may be inserted, appended, and/or associated with these weight values. Accordingly, a weight array similar to that shown in line 4 of FIG. 6 may be produced. In one embodiment of the present invention, the above-described mapping method 100 may be utilized to build the data table of FIG. 6. In yet another embodiment, the above-described mapping method 100 may be utilized to generate an individual weight array as strings are compared or sorted.

As described above, the mapping process 100 recursively proceeds through blocks 102 through 126 until all of the characters in the string have been analyzed. Accordingly, a weight array is produced. The weight array can be utilized in most generally known text or string sorting methods. As can be appreciated by one of ordinary skill in the art, the comparison of two or more Unicode strings can be accomplished by comparing the numeric weights of the two strings. For example, when an operating system function obtains a request to compare two Unicode textual strings, the operating system obtains the strings and returns each string as a sequence of numeric weight values, such as the SM, AW and other Jamo special weight values. By the use of mathematical functions, the operating system can then determine the relative order between the strings by comparing the sequence of weight values.

In accordance with the present invention, the utilization of a preceding modern Hangul weight facilitates the comparison of old Hangul Jamos with modern Hangul characters. In addition, by appending the old Hangul characters to the preceding weight, comparison of two old Hangul Jamos having the same preceding modern Hangul character is also facilitated. It will be understood by one skilled in the relevant art that the present invention facilitates the mapping of a string corresponding to a first numerical set of representative weights to a second string corresponding to a second numerical set of representative weights to permit string comparison.

While an illustrative embodiment of the invention has been illustrated and described, it will be appreciated that various changes can be made without departing from the scope of the invention. Similarly, any process steps described herein might be interchangeable with other steps in order to achieve the same result. In addition, the illustrative examples described above are not intended to be exhaustive or to limit the invention to the precise forms disclosed. For instance, although the illustrative examples disclosed herein involve the Korean language, one can appreciate that the methods of the present invention can apply to other languages having non-indexed words or characters.

The embodiments of the invention in which an exclusive property or privilege is claimed are defined as follows:

1. A method for mapping a plurality of characters in a string, wherein the string comprises a combination of characters representing indexed expressions and a combination of characters representing non-indexed expressions, wherein the method comprises:

generating a set of special weights for a plurality of characters representing a plurality of indexed and non-indexed expressions, wherein the order of the special weights are based on an order of the plurality of characters representing the plurality of indexed and non-indexed expressions;

if a specific group of characters within the string represent a specific non-indexed expression, associating a weight value of an indexed expression with the specific group of characters representing the specific non-indexed expression;

retrieving a plurality of special weights associated with the specific group of characters representing the specific non-indexed expression; and generating a weight array, wherein the weight array comprises the associated weight value of the indexed expression and the plurality of special weights associated with the specific group of characters representing the specific non-indexed expression.

2. The method of claim 1, wherein the weight value associated with the specific group of characters representing the specific non-indexed expression matches an indexed weight value of a proceeding indexed expression.

3. The method of claim 1, wherein the weight array is configured to a format that is compatible with the Unicode standard.

4. The method of claim 1, wherein the weight value represents an alphanumeric weight value in accordance with the Unicode standard.

5. The method of claim 1, wherein each indexed expression represents a modern Hangul character, and wherein each non-indexed expression represents an old Hangul character.

6. The method of claim 5, wherein the weight value associated with the specific group of characters representing the specific non-indexed expression matches a indexed weight value of a proceeding indexed expression.

7. The method of claim 1, wherein the set of special weights for specific characters representing the non-indexed expressions is generated by independently indexing a plurality of categories of characters ordered by the grammatical rules of each category of characters.

8. The method of claim 7, wherein the categories of characters comprises a first category of leading consonants, a second category of vowels, and a third category of trailing consonants.

9. The method of claim 1, further comprising, determining if the specific group of characters in the string properly represent an old Hangul character.

10. The method of claim 1, further comprising, determining if the specific group of characters in the string is valid, wherein the specific group of characters is determined to be valid by determining if a valid number of leading consonants exists in the specific group of characters.

11. The method of claim 1, further comprising the step of compressing the weight array.

12. The method of claim 1, wherein the indexed expressions in the string are indexed in accordance with the Unicode standard.

13. The method of claim 1, wherein the generation of the weight array, comprises, appending the plurality of special weights associated with the specific group of characters representing the specific non-indexed expression to the associated weight value of the non-indexed expression.

14. A computer-readable medium having computer executable code, which when executed, perform the method of claim 1.

15. A computer system having computer executable code, which when executed, perform the method of claim 1.

16. A method for mapping a plurality of characters in a string, wherein the string comprises a combination of Jamo representing modem Hangul, wherein the modem Hangul are indexed by a plurality of standardized weight values, and wherein the string comprises a combination of Jamo representing old Hangul, wherein the method comprises:

generating a set of special weights for Jamo a plurality of characters that represent a plurality of modem and old Hangul, wherein the order of the special weights are based on the order of the plurality of characters that represent a plurality of modern and old Hangul;

if a specific group of Jamo within the string represent a specific old Hangul, associating at least one standardized weight value of a modem Hangul with the specific group of Jamo representing the specific old Hangul, wherein the associated standardized weight value is selected from the modem Hangul that precedes the old Hangul;

retrieving a plurality of special weights associated with the specific group of Jamo representing the specific old Hangul; and generating a weight array, wherein the weight array comprises the associated standardized weight value of the modern Hangul and the plurality of special weights associated with the specific Jamo representing the specific old Hangul.

17. The method of claim 16, wherein the standardized weight value represents an alphanumeric weight value in accordance with the Unicode standard.

18. A computer-readable medium having computer executable code, which when executed, perform the method of claim 16.

19. A computer system having computer executable code, which when executed, perform the method of claim 16.

* * * * *